No. 855,537. PATENTED JUNE 4, 1907.
E. F. SMITH.
WRENCH.
APPLICATION FILED APR. 19, 1906.
2 SHEETS—SHEET 1.
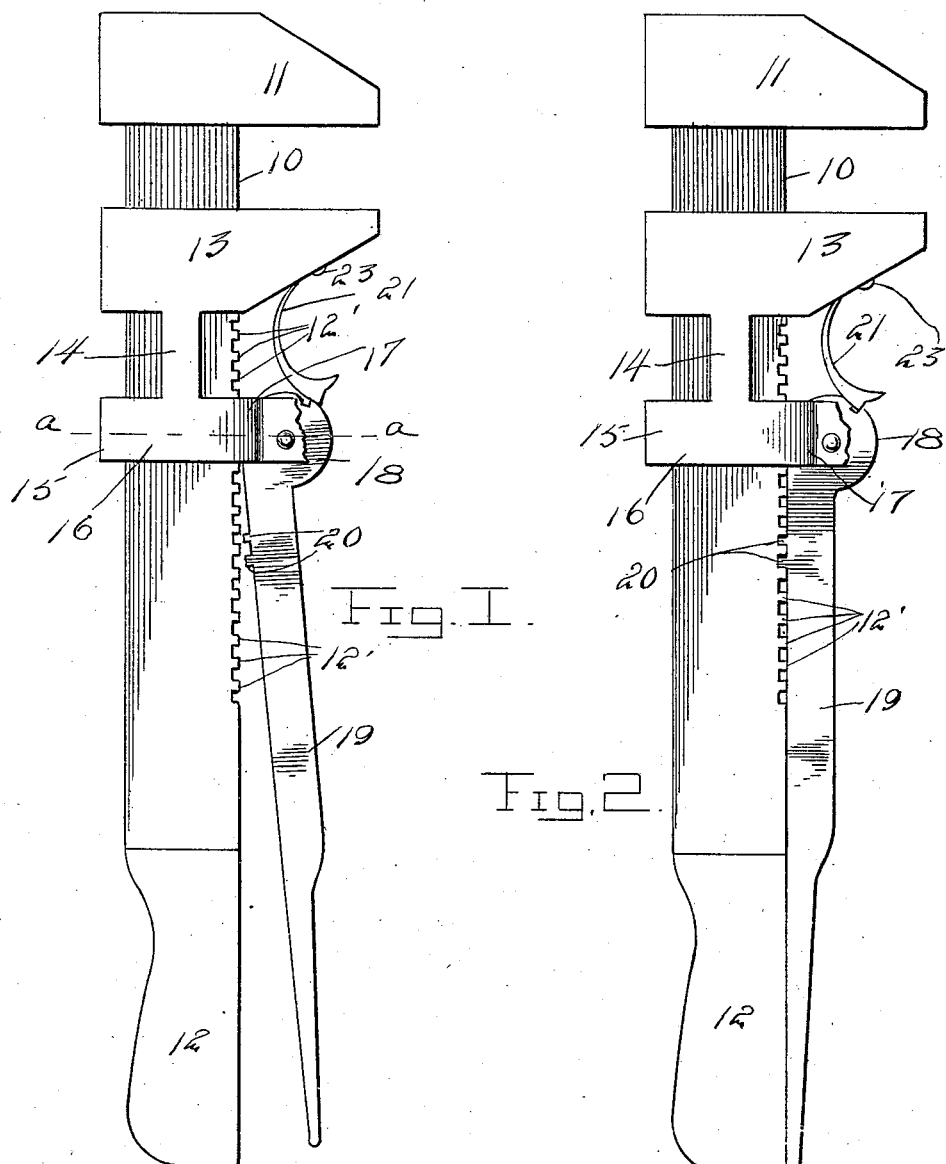

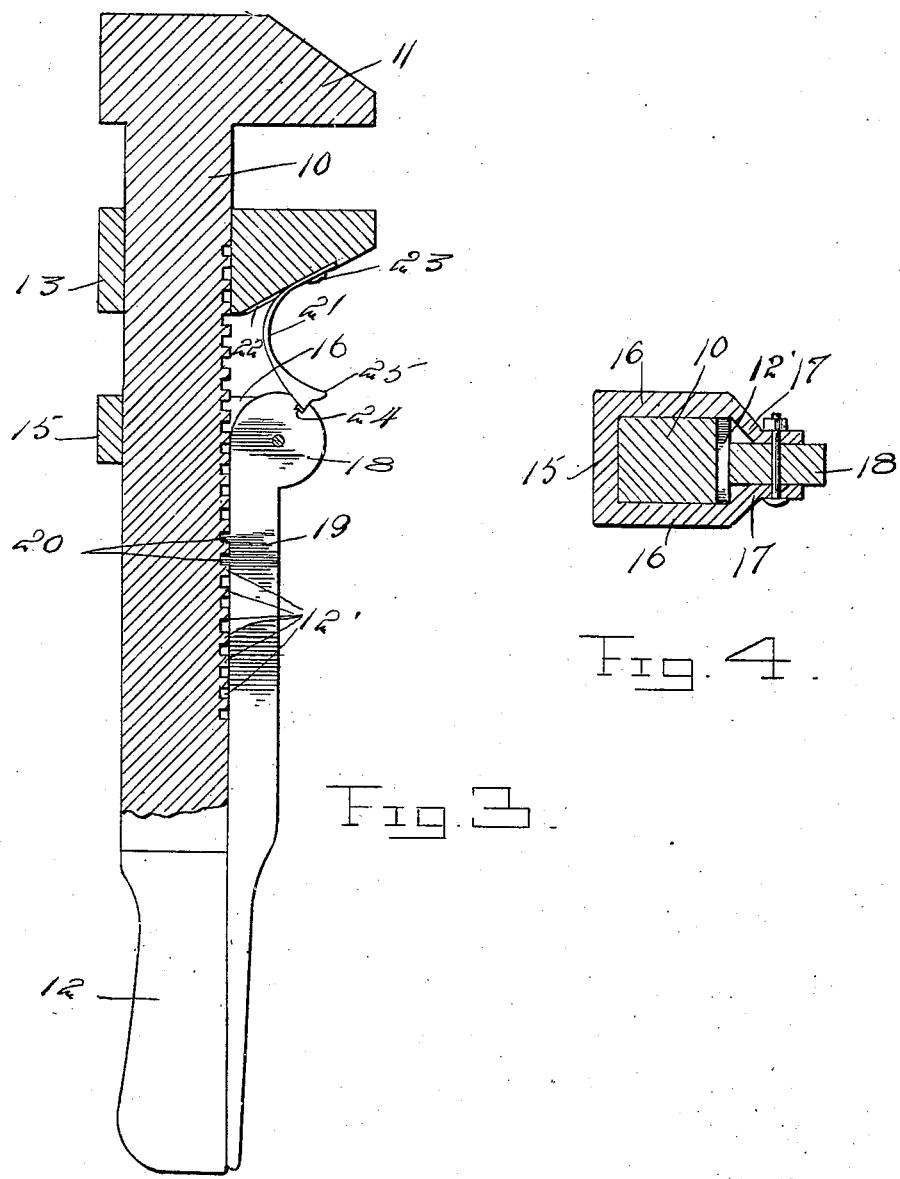

UNITED STATES PATENT OFFICE.

EDMOND F. SMITH, OF SHINNSTON, WEST VIRGINIA.

WRENCH.

No. 855,537.      Specification of Letters Patent.      Patented June 4, 1907.

Application filed April 19, 1906. Serial No. 312,669.

*To all whom it may concern:*

Be it known that I, EDMOND F. SMITH, a citizen of the United States, residing at Shinnston, in the county of Harrison, State of West Virginia, have invented certain new and useful Improvements in Wrenches; and I do hereby declare the following to be a full, clear, and exact description of the invention, such as will enable others skilled in the art to which it appertains to make and use the same.

This invention relates to wrenches, and more particularly to that class having a rack shank and a lever connected with a sliding jaw on the shank and having teeth for engagement with the teeth on the shank, the primary object of the invention being to provide means for holding the lever against accidental displacement from the shank when set at the proper adjustment.

The particular means contemplated by the invention is a spring pawl which is arranged to engage in a notch formed in the end of the said lever.

With these and other ends in view, the invention consists in the construction and arrangement of parts hereinafter fully described, shown in the accompanying drawings and particularly pointed out in the appended claims, it being understood that various changes in the form, proportion, size and minor details may be made within the scope of the claims without departing from the spirit or sacrificing any of the advantages of the invention.

In the drawings:—Figure 1 is a view in elevation of the wrench, the lever being shown in position to permit adjustment of the sliding jaw. Fig. 2 is a similar view showing the lever after adjustment. Fig. 3 is a longitudinal section through the wrench with parts in elevation. Fig. 4 is a section on line *a—a* of Fig. 1.

Referring more specifically to the drawings, the numeral 10 denotes the shank of the wrench which is provided at one end with a fixed jaw 11, at the opposite end with a handle 12, and along one edge with a series of rack teeth 12.

Slidably mounted upon the shank 10 is a movable jaw 13 and connected with the said jaw by means of connecting portions 14, which lie against the side of the said shank, is a yoke member 15, which is designed for the purpose of supporting the locking lever. The said yoke member comprises spaced side members 16 between which the shank 10 is received and a connecting portion which lies against the edge of the shank opposite that in which the rack teeth 12' are formed. At their ends the side members 16 are bent slightly inwardly toward each other and thence downwardly as at 17 and pivoted intermediate the said downwardly extending portions 17 is the headed end 18 of a locking lever 19, which is designed to hold the sliding jaw in proper position.

The lever 19 is provided upon its edge opposing the rack edge of the shank with two or more teeth 20, which, when the lever lies against the said edge of the shank, engage between the adjacent rack teeth thereon to prevent movement of the sliding jaw.

In order to prevent accidental disengagement of the lever from the shank after the proper adjustment has been obtained, I provide a spring pawl 21 which is seated at one of its ends in a recess 22 formed in the face of the sliding jaw 13 opposing the said lever, the said spring pawl being removably held in the said recess by means of a screw 23. As shown in the drawings, the pawl is of considerably less width than the jaw itself as is also the recess 22, the pawl being in the manner held against turning out of its proper alinement. The spring pawl 21 is bent at a tension in the arc of a circle with its free end resting against the head 18 which is substantially circular in form and which is provided in its periphery with a notch 24 in which the said end of the pawl is adapted to seat when the lever lies against the shank 10, the said pawl being movable out of engagement with the head for the purpose of adjustment by means of a finger piece 25 which is formed integral with the end of the pawl.

What is claimed, is:—

1. A wrench of the class described comprising a rack shank, a fixed jaw carried by the shank, a movable jaw slidably engaged upon the shank, said movable jaw being provided with an extension, a lever pivoted to the extension and having a notched head of substantially circular form, and a spring pawl having an integral portion bearing against the periphery of the head and adapted at times to enter the notch formed therein.

2. A wrench of the class described comprising a rack shank, a fixed jaw carried by the shank, a movable jaw slidably engaged upon the shank, said movable jaw being provided with an extension, a lever pivoted to the extension and having teeth for engagement with the rack teeth upon the shank, said lever being provided with a substantially circular head having a notch formed in its periphery, a spring pawl having one of its ends secured in a recess formed in the sliding jaw proper and having an integral portion normally resting in engagement with the periphery of the head and adapted for engagement at times in the notch formed therein.

In testimony whereof, I affix my signature, in presence of two witnesses.

EDMOND F. SMITH.

Witnesses:
ROSE HIGINBOTHAM,
ROSA CAROTHERS.